(12) United States Patent
Nomura et al.

(10) Patent No.: US 7,630,365 B2
(45) Date of Patent: Dec. 8, 2009

(54) COMMUNICATION CONTROL METHOD AND COMMUNICATION APPARATUS EMPLOYING THE SAME

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 11/266,177

(22) Filed: Nov. 4, 2005

(65) Prior Publication Data

US 2006/0280118 A1 Dec. 14, 2006

(30) Foreign Application Priority Data

Jun. 13, 2005 (JP) ............... 2005-172678

(51) Int. Cl.
*H04L 12/28* (2006.01)
(52) U.S. Cl. .................. 370/389; 370/400; 370/432
(58) Field of Classification Search .................. 370/254
See application file for complete search history.

(56) References Cited

U.S. PATENT DOCUMENTS

2002/0073338 A1* 6/2002 Burrows et al. ............. 713/201

2004/0081083 A1* 4/2004 Sekihata ..................... 370/222

FOREIGN PATENT DOCUMENTS

JP 2002-252625 9/2005

* cited by examiner

*Primary Examiner*—Chirag G Shah
*Assistant Examiner*—Nima Mahmoudzadeh
(74) *Attorney, Agent, or Firm*—Fujitsu Patent Center

(57) ABSTRACT

Disclosed is a communication control method for recovering communication failures caused by a packet loop that occurs as a result of L2-level misconnection at relay switches in a communication system where data transmission/reception is carried out between a plurality of end hosts connected to the relay switches within a subnet. The method includes the steps of consecutively sending packets each having, as its originator address, a MAC address other than an originator MAC address of an end host desired to be communicated making up the subnet; thereby stopping the packet loop; and then sending packet data using, as a destination MAC address, a MAC address of a destination end host.

8 Claims, 13 Drawing Sheets

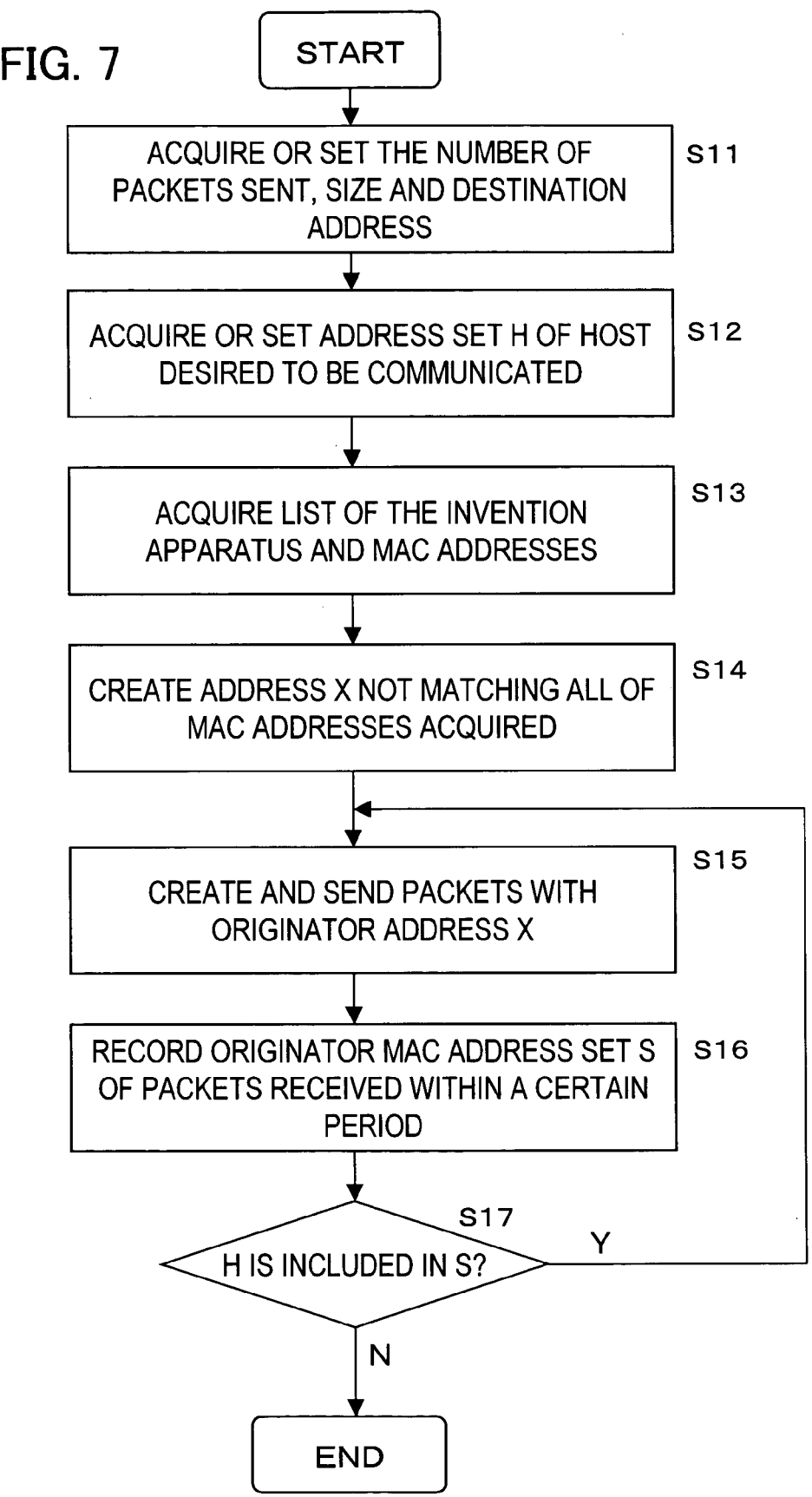

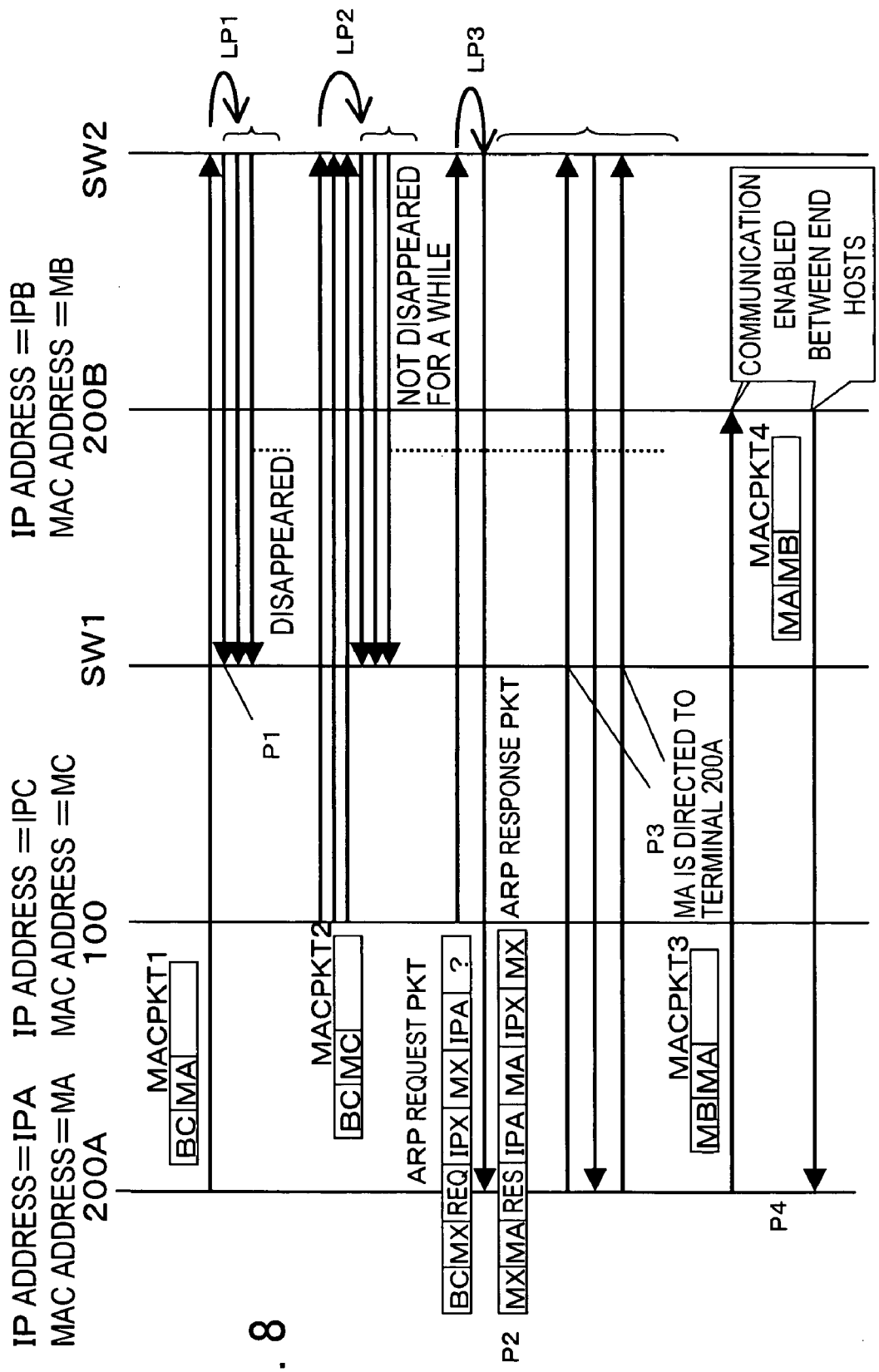

MAC PACKET STRUCTURE

ARP PACKET STRUCTURE

COMMUNICATION CONTROL METHOD AND COMMUNICATION APPARATUS EMPLOYING THE SAME

CROSS-REFERENCE TO RELATED APPLICATIONS

This application is based upon and claims the benefit of priority from the prior Japanese Patent Application No. 2005-172678, filed on Jun. 13, 2005, the entire contents of which are incorporated herein by reference.

BACKGROUND OF THE INVENTION

1. Field of the Invention

The present invention relates to a communication control method and communication apparatus employing the method. More particularly, the invention relates to a communication control method for securing communications when an L2 loop occurs, and a communication apparatus employing the method.

2. Description of the Related Art

In networks is known an L2 loop (broadcast storm) which is one of extremely frequent faults which may occur as a result of mal-connections of LAN cables (see, e.g., Japanese Patent Application Laid-open Publication No. 2002-252625). When this L2 loop occurs, the transmission paths are not only subjected to high loads all over the subnets, but also there appears phenomenon called black hole phenomenon by which packets are forwarded to the point where the loop is present.

Following is a description of the mechanism by which such an L2 loop occurs. FIGS. 1A and 1B are diagrams describing the L2 loop occurring mechanism.

As shown in FIG. 1A, terminal 1 broadcasts packets with the originator address of "A", which is the MAC address of the terminal 1, and then, the packets are forwarded by relay switches SW1, SW2 and SW3 such that the packets reach all the terminals 2 and 3 within a subnet.

At that time, the relay switches SW1, SW2 and SW3 learn "A" which is a packet issuing MAC address at a port receiving the packet. In other words, the switches learn that a terminal having the MAC address "A" is present ahead of this port. This enables each of the relay switches to determine a port to which the packet is forwarded based on the result of this learning when a packet having a destination MAC address "A" is next sent from another terminal.

However, as shown in FIG. 1B, when the cables become looped as a result of mal-connection of the LAN cables at the relay switch SW3 for example, a broadcast packet sent from the terminal 1 loops. Thus, each time the packet sent from the terminal 1 loops at the relay switch SW3, the packet from the terminal 1 is sent from the looping point such that the relay switches SW1, SW2 and SW3 within the subnet erroneously learn the MAC addresses as the terminal 1 of the MAC address "A" being present at the looping point, based on the same principle as that used in the previous description.

As a result, even though another terminal intends to send a packet destined for the terminal 1, the packet disappears into the looping point formed at the relay switch SW3, and therefore a packet cannot normally arrive at the terminal 1, disabling the communication to the terminal 1.

Since apparatuses, personal computers and routers using Windows (OS provided by Microsoft Corp.) often send a broadcast packet, there occurs phenomena that the terminal which has once sent the broadcast packet becomes prevented from performing communications within the subnet.

Although Japanese Patent Application Laid-open Publication No. 2002-252625 discloses a technique for detecting the point where such a loop occurs, there has hitherto been no technique for correcting the addresses which have erroneously been learned after the occurrence of the loop. It has hitherto been difficult to communicate with a terminal lying within the loop subnet unless the loop is fundamentally ceased by disconnecting the loop occurring source through physical works such as removing the cables.

Such a disconnection work has led disadvantageously to high time and human costs due to the need to identify the looping point.

SUMMARY OF THE INVENTION

It is therefore an object of the present invention to provide a communication control method enabling communications within a subnet by securing communication paths between hosts within a loop subnet or between a host within the loop subnet and a host outside the loop subnet even though the L2 loop broadcast storm occurs.

In order to achieve the above object, according to an aspect of the present invention there is provided a communication control method for recovering communication failures caused by a packet loop that occurs as a result of L2-level misconnection at relay switches in a communication system where data transmission/reception is carried out between a plurality of end hosts connected to the relay switches within a subnet, the method comprising the steps of consecutively sending packets each having, as its originator address, a MAC address other than an originator MAC address of an end host desired to be communicated making up the subnet; thereby stopping the packet loop; and then sending packet data using, as a destination MAC address, a MAC address of a destination end host. The destination of the packets to be consecutively sent may be a broadcast address. The packets to be consecutively sent may be directed to a unicast address using as a destination an address not existing in the subnet. The packets to be consecutively sent may be multicast using as an originator MAC address an address not existing in the subnet. The MAC address other than an originator MAC address of an end host desired to be communicated may be a MAC address other than an existent MAC address acquired by monitoring communication and an existent MAC address identified in advance. The communication control method may further comprise the step of setting a MAC address not existing within the subnet as the originator address to consecutively send the packets to be broadcast. The communication control method may further comprise the steps of setting an MAC address not existing within the subnet as the originator address; sending packets whose destination is a broadcast address, to which the end host desired to be communicated respond in unicast; and thereby allowing the relay switch within the subnet to correctly learn the MAC address of the end host. The communication control method may further comprise the steps of setting an MAC address not existing within the subnet as the originator address; sending unicast packets whose destination is an address not existing within the subnet; and thereby allowing the relay switch within the subnet to correctly learn the MAC address of the end host. The communication control method may further comprise the steps of setting an MAC address not existing within the subnet as the originator address; sending packets whose destination is a multicast address, to which the end host desired to be communicated respond in unicast; and thereby allowing the relay switch within the subnet to correctly learn the MAC address of the end host.

In order to attain the above object, according to another aspect of the present invention there is provided a communication control method for recovering communication failures caused by a packet loop that occurs as a result of L2-level misconnection at relay switches in a communication system where data transmission/reception is carried out between a plurality of end hosts connected to the relay switches within a subnet, the method comprising the steps of consecutively sending packets each having, as its originator address, a MAC address of an end host desired to be communicated; thereby causing to delete a MAC learning table of the relay switch in the event that broadcast packets have the same originator address; and sending packet data using, as a destination MAC address, a MAC address of a destination end host.

In the above aspect, the communication control method may further comprise the steps of sending ARP (Address Resolution Protocol) broadcast packets; and thereafter sending packets intended to correct mis-learning to acquire a MAC address from an IP address of the end host. The consecutive sending of the packets may be executed by an apparatus disposed at a remote site.

Thus, even though the L2 loop broadcast storm occurs, the communication paths are secured between the hosts within a loop subnet or between a host within the loop subnet and a host outside the loop subnet, enabling the communications within a subnet.

BRIEF DESCRIPTION OF THE DRAWINGS

The above and other objects, aspects, features and advantages of the present invention will become more apparent from the following detailed description when taken in conjunction with the accompanying drawings, in which:

FIG. 7 shows an operation flow of the invention apparatus 100 of the second embodiment;

FIG. 8 shows a signal sequence flow of a third embodiment;

DESCRIPTION OF THE PREFERRED EMBODIMENTS

Embodiments of the present invention will now be described with reference to the accompanying drawings. It is to be appreciated that the embodiments are given for the purpose of understanding the present invention and that the technical scope of the present invention is not intended to be limited thereto.

The fundamental principle of the present invention lies in correcting the erroneous address learning upon the loop occurrence by consecutively sending packets from remote. This enables communications with terminals within a subnet without disconnecting the loop occurring source and enables remarkable reduction of the time and human costs for recovering the communications, which have hitherto been needed.

It is thus sufficient that there exist no looped packets having MAC addresses of both communication sender and destination terminals as source addresses, and hence the principle of the present invention lies in that packets meeting these conditions are consecutively broadcast for replacement with intentionally looped packets.

According to the present invention, at relay switch ports making up a loop, packets are consecutively input and while simultaneously existing loop packets are also input, whereupon two (2) inputs are present on a single output port. Since this consecutively occurs, input or output queues overflow, as a result of which looped packets are discarded by the queue overflow at the relay switch, enabling the state where only packets sent according to the present invention are becoming looped to be created.

The above principle prevents packets causing mis-learning of the MAC addresses from being sent from the loop, enabling the communication with the terminals (end hosts) within a subnet.

Figure 1A:
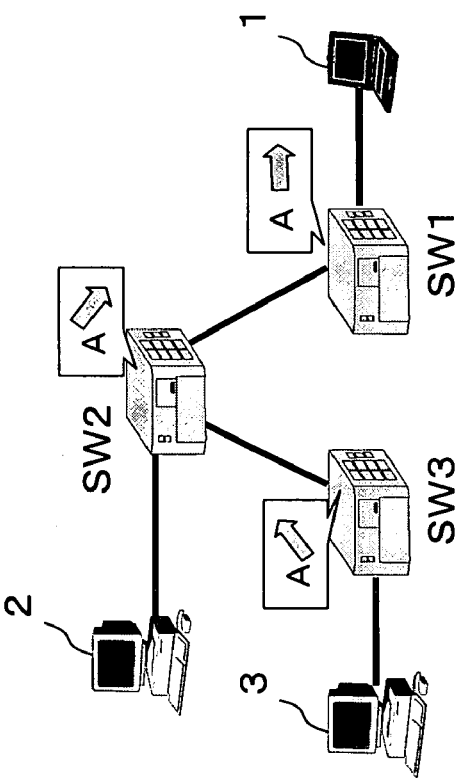
FIGS. 1A and 1B are explanatory Views of the mechanism with which an L2 loop (broadcast storm) occurs.
Figure 1B:
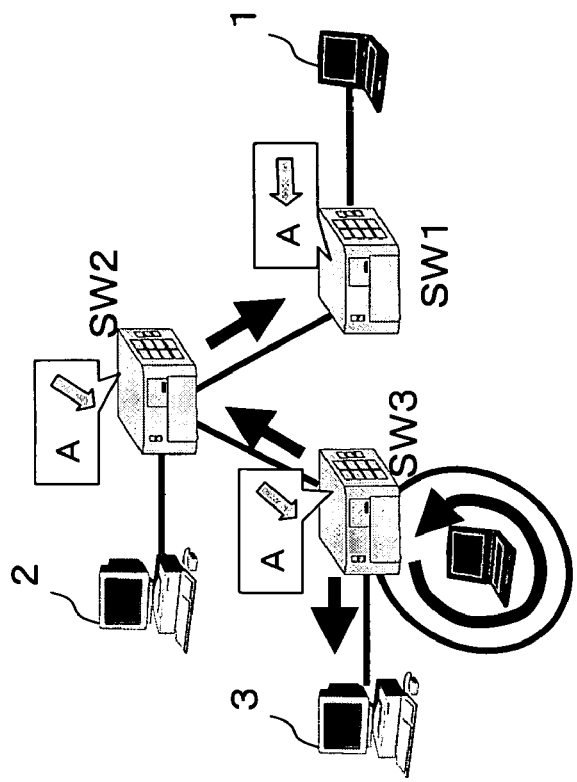
Figure 2:
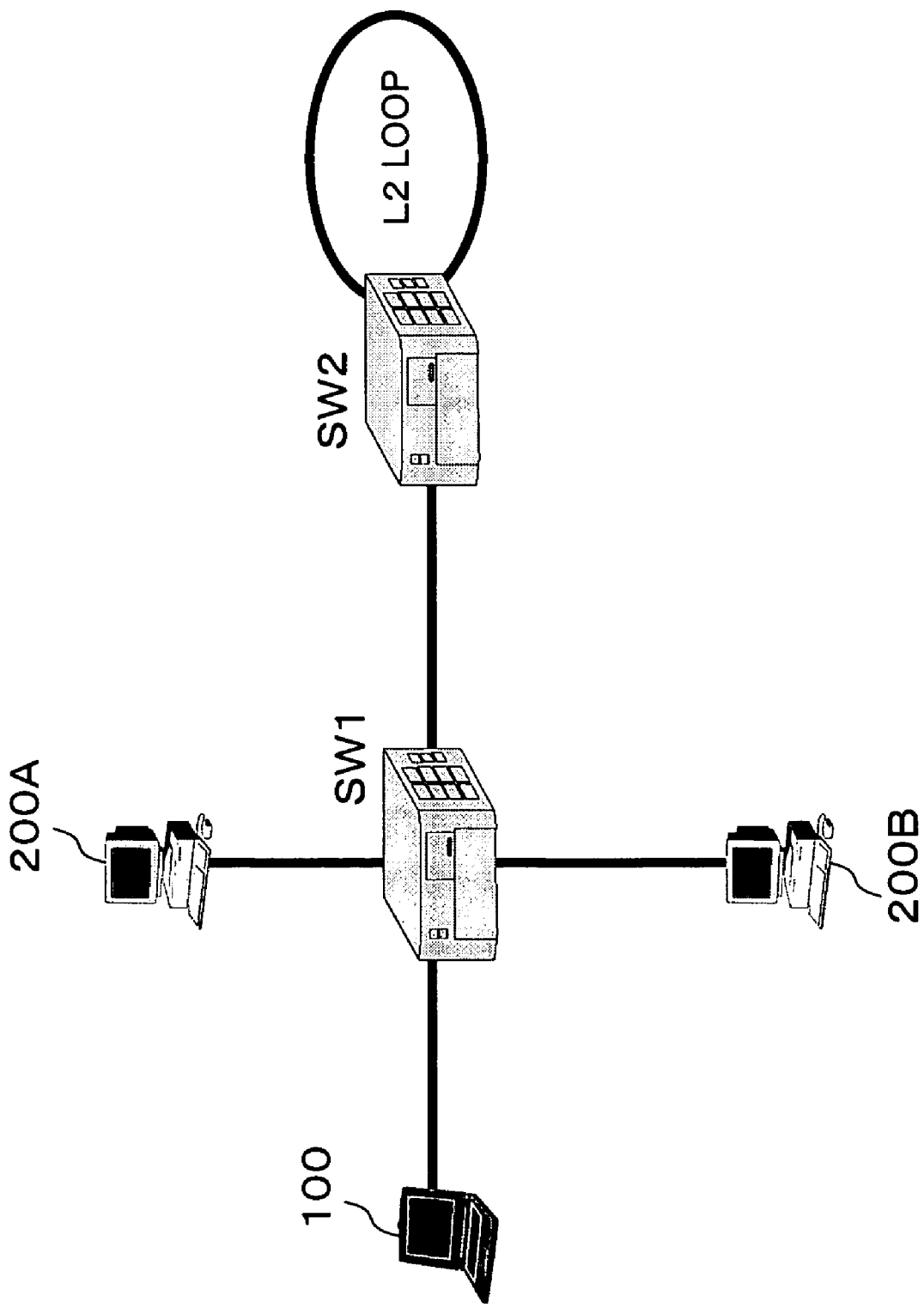
FIG. 2 shows an exemplary configuration of a subnet for describing an embodiment of the present invention implementing the principle of the invention.

FIG. 2 shows an example of the subnet configuration for describing the present invention implementing the above principle. A relay switch SW1 connects to end hosts 200A and 200B and to a communication apparatus 100 (hereinafter referred to as the invention apparatus 100) to which the method of the present invention is applied as a concept of one host, for recovering the communications at the L2 looping. The state is shown where a cable-connected relay switch SW2 is ahead of the relay switch SW1 with L2 loop occurring as a result of cable mal-connection at the relay switch SW2.

First Embodiment

Figure 3:
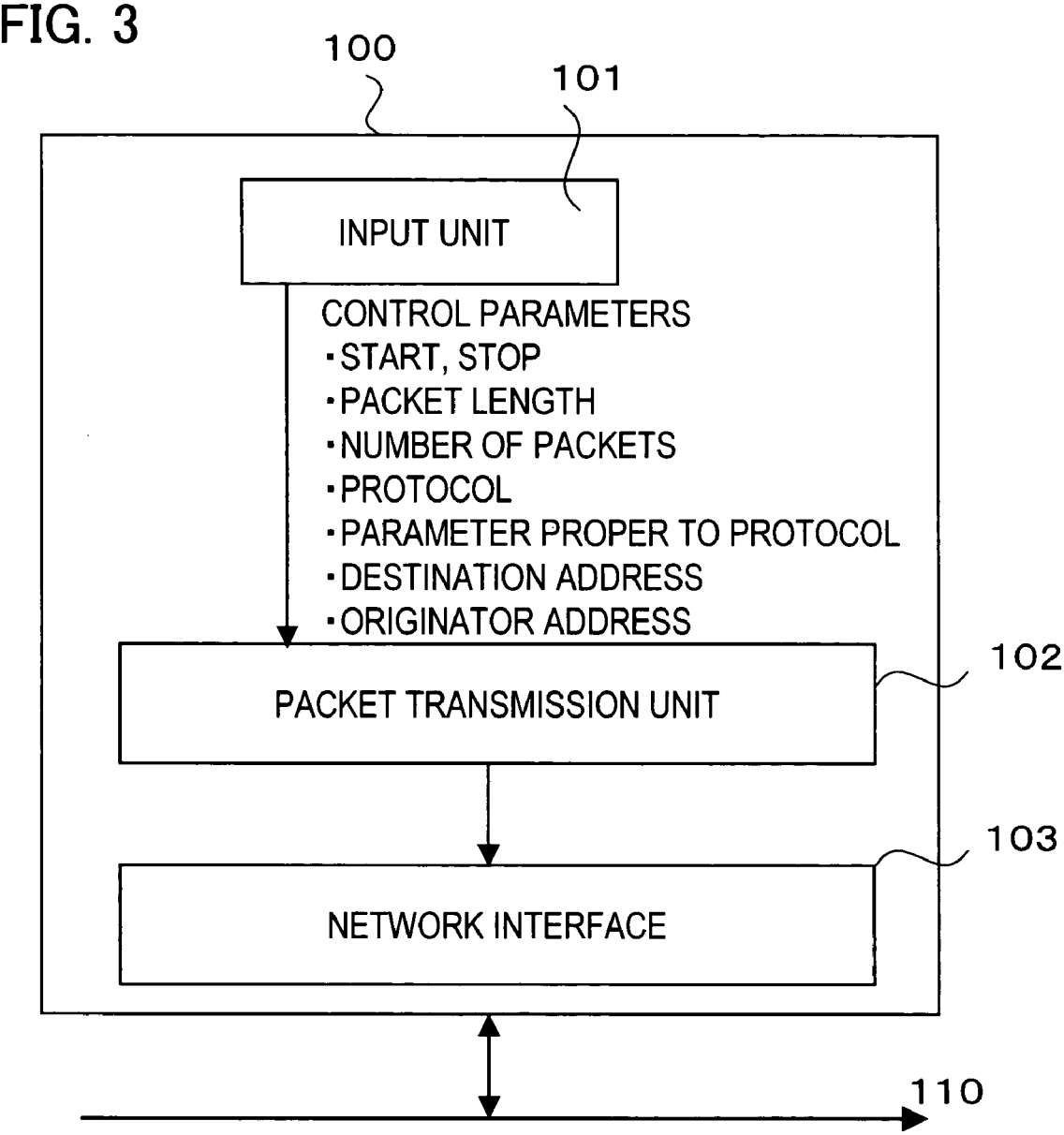
FIG. 3 shows an exemplary functional configuration of an invention apparatus 100 according to the present invention.
Figure 4:
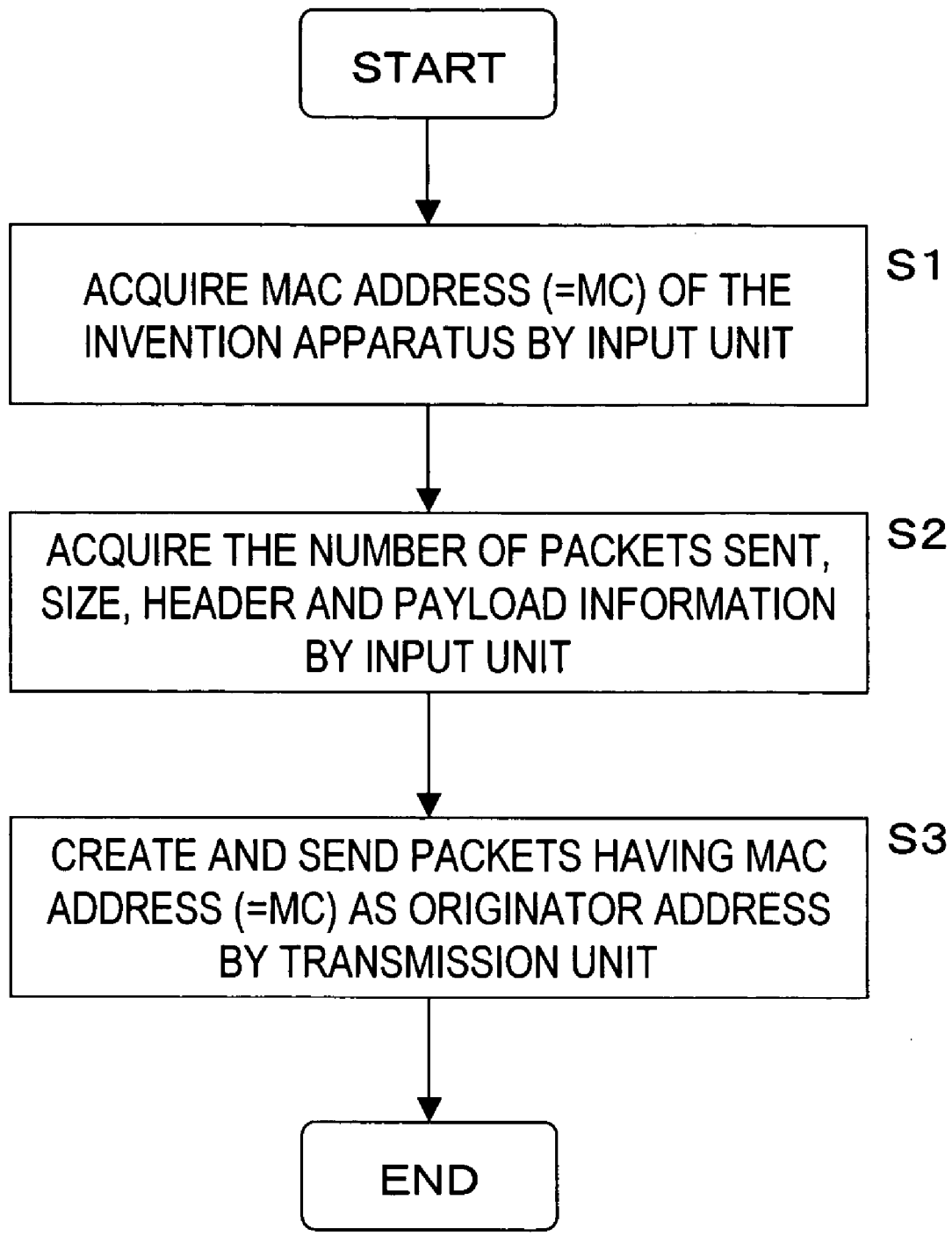
FIG. 4 shows an operation flow of the invention apparatus 100 corresponding to the embodiment of FIG. 2.
Figure 5:
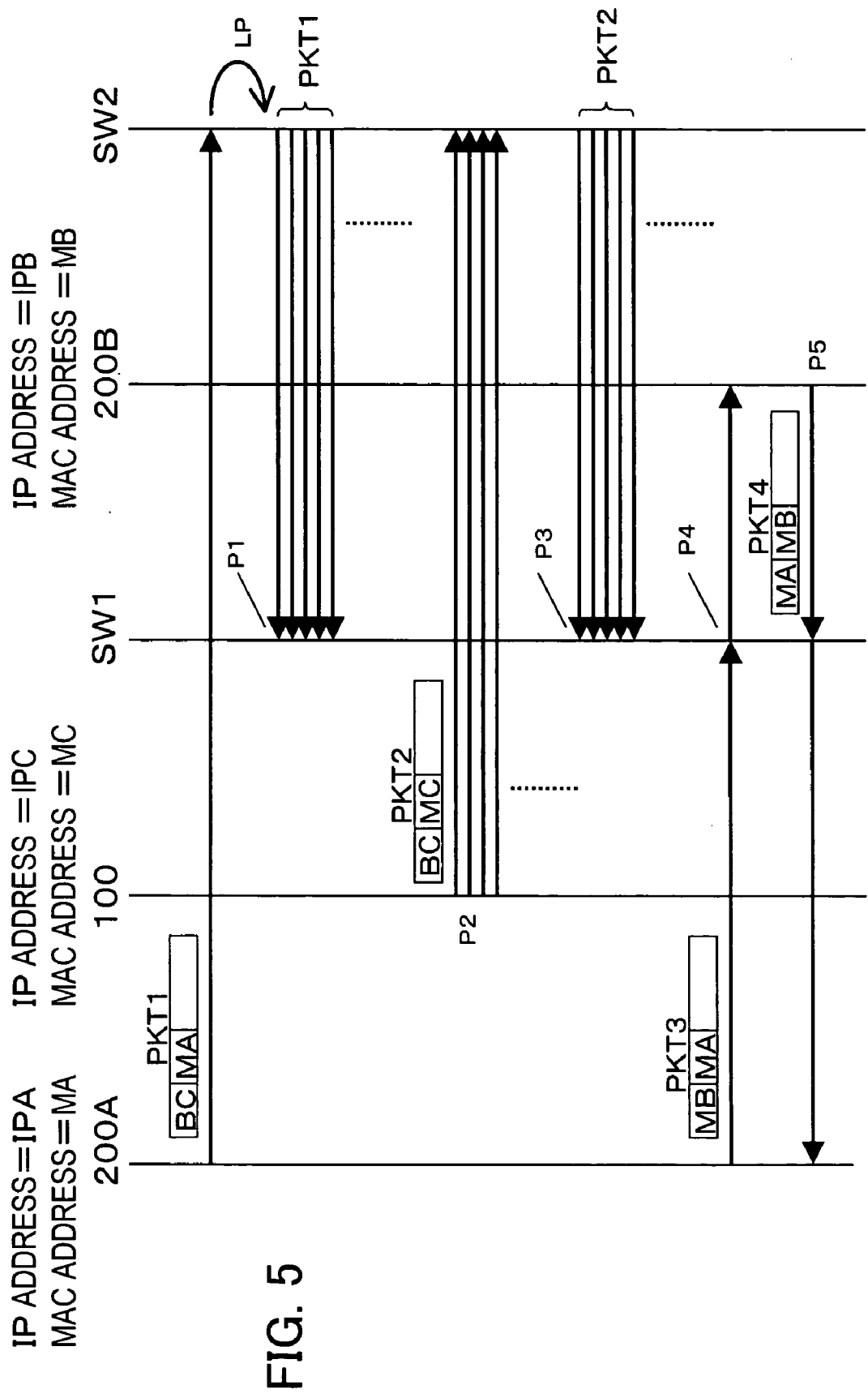
FIG. 5 shows signal sequences in the subnet.

FIG. 3 is a diagram showing an example of the functional configuration of the invention apparatus 100 according to the present invention. FIG. 4 is an operation flow of the invention apparatus 100 corresponding to the embodiment of FIG. 3, and FIG. 5 is a diagram showing sequences of signals in the subnet of FIG. 2.

Reference will be made to these figures to describe a first embodiment of the present invention.

The invention apparatus 100 has a function of sending specified packets (Ether header destination address, originator address, protocol, payload corresponding to the protocol, etc.) In a specified number of times and sends consecutively into the subnet packets that have been broadcast with the MAC addresses not existing in the subnet as the originator addresses. This presents an effect of stopping the end host MAC address to be communicated being erroneously learned by the relay switches SW1 and SW2.

In the functional block of the invention apparatus 100 shown in FIG. 3, an input unit 101 acquires an MAC address (=MC) of the invention apparatus 100 (step S1 of FIG. 4) and further acquires control parameters such as the number of packets sent, the size, header and payload information thereof (step S2). Then, a packet transmission unit 102 creates packets having the MAC address (=MC) as the originator address in accordance with the input control parameters and sends the packets through a network interface (step S3).

Delivered to the packet transmission unit 102 as the control parameters of the invention apparatus 100 are protocol, destination MAC address, originator MAC address, packet length and parameters proper to the upper protocol of the MAC packet. These parameters of the packets to be sent may all be altered, may be default values or may be unalterable at fixed values. The packet transmission unit 102 instructed to send packets creates the packets based on the control parameters and send them via the interface 103 to a network 110. If an instruction to stop is given, the packet transmission unit 102 stops the transmission of the packets.

In this case, each packet is configured such that the destination address and originator address are written to its header portion. For example, using the default parameters from the input unit 101, the packet transmission unit 102 sends 10,000 packets for example with ARP (Address Resolution Protocol) request frame for Ethernet longest packet of 1,514 bytes, with the destination MAC address in the form of FF-FF-FF-FF-FF-FF MAC broadcast, the originator address being the MAC address of the invention apparatus 100, the address required by the ARP being IP address(=IPC) of the invention apparatus 100. This enables the looped packets to be replaced with packets sent by the invention apparatus 100.

For example, a case is contemplated in FIG. 2 where a broadcast (BC) packet PKT1 sent from the end host 200A loops at the relay switch SW2, with the result that the MAC address (=MA) of the end host 200A is continuously erroneously learned at the relay switches SW1 and SW2 (see P1 of FIG. 5, where MA is the looping direction).

In this state, the invention apparatus 100 issues a large number of broadcast packets PKT2 (see P2 of FIG. 5). This results in the looping direction represented by the MAC address (=MC) of the invention apparatus 100 to clear away the looped packets PKT1 sent from the end host 200A. Thus, there can be stopped the state where the packets PKT1 become looped, which may cause the mis-learning.

It is to be noted that this state merely stops the looping of the packets from the end host 200A causing the mis-learning and that the mis-learning remains unsolved.

Afterwards, for example, the end host 200A that is a communication originator sends a unicast packet PKT3 to the end host 200B not performing any voluntary mis-learning. This allows the address of the end host 200A to arrive at the end host 200B while being correctly learned on the relay switch SW1 (see P4 of FIG. 5).

As a result, communication from the end host 200B to the end host 200A also arrives at the end host 200A through a path where a response packet PKT4 is correctly learned (see P5 of FIG. 5).

The above mechanism ensures the correction of mis-learning such that communication between the end hosts 200A and 200B is enabled even in the state where the L2 loop occurs.

In this case, available as the destination MAC address of the MAC packet PKT2 to be sent is a multicast address of the MAC packet or a unicast address of the MAC packet not used in the subnet, in addition to the broadcast (=BC) address of the MAC packet.

The originator address of the MAC packet to be sent need not be the MAC address (=MC) of the invention apparatus 100 but can be any address other than the MAC address possessed by the end host to be communicated. The originator address may be a unicast address of the MAC packet not used in the subnet, a unicast address of the MAC packet being used in the subnet, a MAC broadcast address, or a MAC multicast address.

If, for example, ARP is sent with the originator address in the form of any MAC address not existing in the subnet, then in case the packets sent from the invention apparatus 100 become looped, the sent packets will be continued to be resent from the looping point to the overall areas of the subnet. At that time, the MAC address learned at each of the relay switches is an earlier created MAC address of a really nonexistent end host, and hence no influence can be imparted to any really existent hosts inclusive of the invention apparatus 100 even though the MAC address is erroneously learned at each relay switch as the MAC address being present at the looping point.

The sent protocol is not intended to be limited to the ARP, and any upper protocols are also available such as IP (Internet Protocol), ICMP (Internet Control Message Protocol) and IPX (Internet Packet Exchange). Alternatively, there may also be used presently unused protocol that is not interpretable by the end host or normally uninterpretable packet. The sent packet length and the number of packets to be sent can be any values as long as packets capable of being actually sent over the network are used.

The invention apparatus 100 need not necessarily be disposed within the looping subnet. For example, in the case where it is disposed within a network different from the looping subnet, the same applies thereto by consecutively sending the ICMP Echo Request having as its destination the IP broadcast address destined for the looping subnet, or by consecutively sending packets to which routers such as RIP within the looping subnet such as RIP respond with broadcast packets or by consecutively sending packets to which the end host within the NetBIOS looping subnet respond with the broadcast packets. The invention apparatus 100 may send a MAC packet with a VLAN (Virtual Local Area Network) tag attached thereto such that the packets can be sent to any appropriate subnet by specifying VLANtag used in the looping subnet.

Second Embodiment

A second embodiment will hereinafter be described where the looped reception packets are sent while being monitored.

Figure 6:
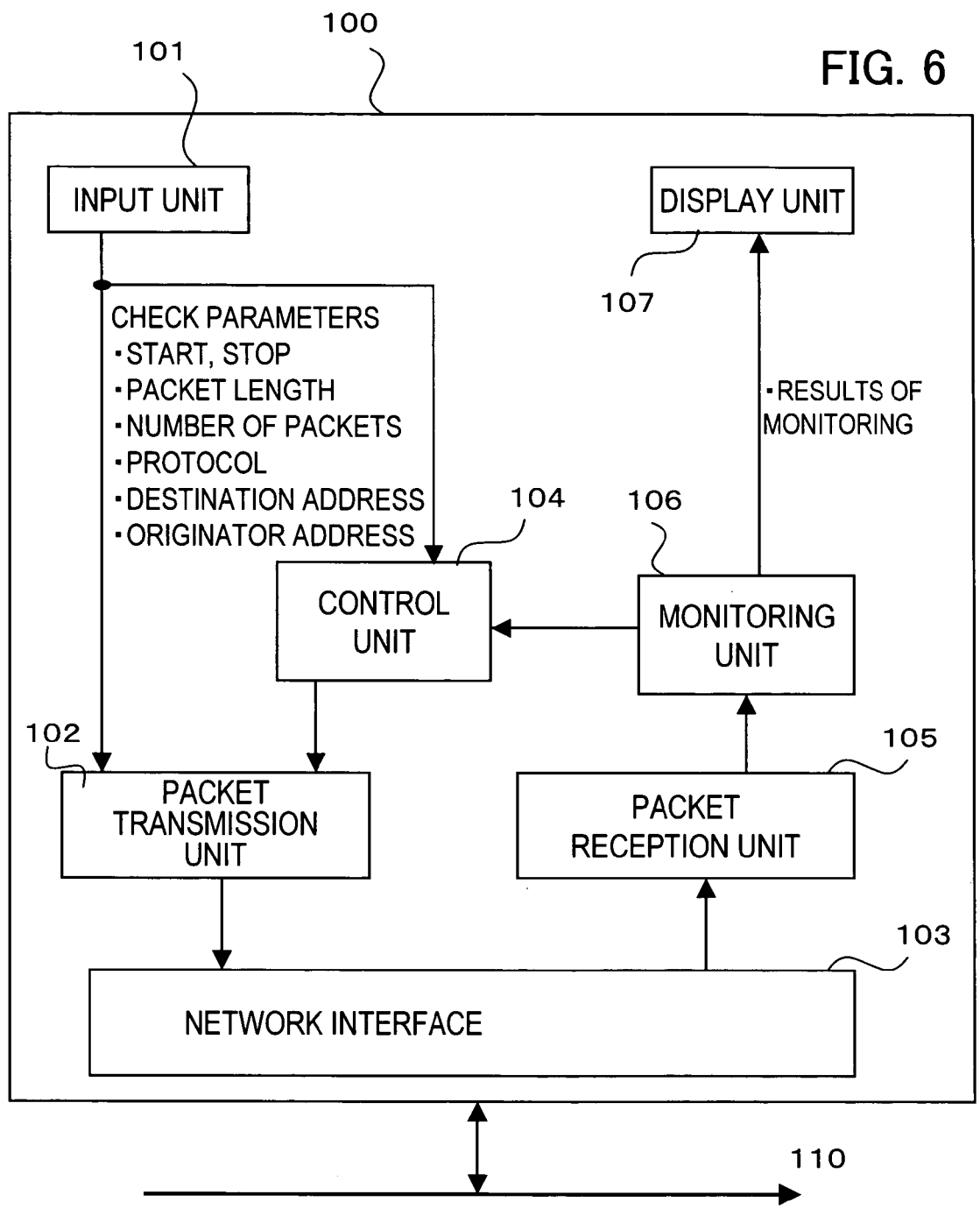
FIG. 6 shows an exemplary apparatus configuration of the invention apparatus 100 of a second embodiment.

The configuration of the subnet in the second embodiment is as shown in FIG. 2. FIG. 6 shows an example of the apparatus configuration of the invention apparatus 100 according to the second embodiment. FIG. 7 is a flowchart of the operation thereof.

In the exemplary configuration of the invention apparatus 100 show in FIG. 6, the input unit 101 acquires check parameters and the packet transmission unit 102 sets the number of packets to be sent, the size and destination addresses thereof (step S11).

An address set H of a host to be communicated is acquired or set (step S12). A MAC address list is then acquired including the MAC address of the invention apparatus 100 and MAC addresses on-subnet(step S13).

An address X is then created that does not appear in the thus acquired MAC address list (step S14). 5,000 ARP packets are issued for an example, with the originator address in the form of the thus created address X (step S15).

On the contrary, a monitor unit 106 records therein all of the originator addresses of the Ethernet packets received during a certain period of time, e.g., for one (1) second. After the reception of one (1) second, a set S of the received originator MAC addresses are recorded therein (step S16).

Comparison is then made between the set S of the originator MAC addresses of the packets received during the period and the address set H of the host to be communicated (step S17). If the address set H is not included in the set S in this comparison (N of step S17, then the really existent end hosts 200A and 200B are not subjected to any influence of the mis-learning such that communication therewith becomes enabled, ending the procedure. If included (Y of step S17), then the packet sending with X as the originator address (S15) is continued until the set H becomes not included in the set S.

Although in this embodiment the sending operation is repeated infinitely as long as even only one MAC address of the really existent end host is included in the originator MAC addresses of the received packets (the set H is included in the set S: Y of step S17), the sending operation may be stopped when reaching the limited number of times.

Alternatively, the receiving operation need not necessarily be continued during a certain period of time. That is, each time the packet is received, comparison may be made at step S17 of whether the originator address matches the MAC address of the end host really existing within the subnet. If affirmative, the packet with any non-existent MAC address as the originator address may consecutively be issued in the same manner as the first embodiment.

Alternatively, the received originator MAC address of the broadcast packet may first be acquired and recorded received by the monitor unit 106 during a certain period of time. Then, in case the MAC address of the end host to be communicated matches the received originator MAC address recorded by the monitor unit 106, the above sending operation may be executed such that the sending operation may not be executed unless the MAC address of the end host to be communicated is erroneously learned. This prevents the network from being subjected to any unnecessary load.

In case the broadcast packet whose originator address comes from the end host to be communicated is not currently looped but was looped in the past, the MAC address may possibly be erroneously learned. For this reason, the above sending operation (step S15) may be executed in case the end host cannot be communicated when it is verified that no loop occurs for the certain period of time.

Thus, with the above state, by sending and receiving the packets intended for communication between the end hosts, the communication can advantageously be recovered even though any mis-learning takes place.

Third Embodiment

Description will be made of a third embodiment where the host causes responding broadcast packets to loop.

The third embodiment is characterized by stopping all of the states where the packets causing mis-learning are looped and correcting the mis-learning to ensure normal learning. The network configuration is as shown in FIG. 2, and FIG. 8 is a signal sequence flow in this embodiment.

Figure 9A:
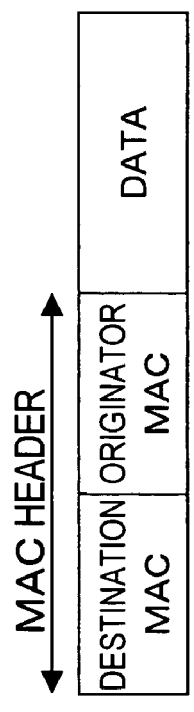
FIGS. 9A and 9B show packet formats.
Figure 9B:
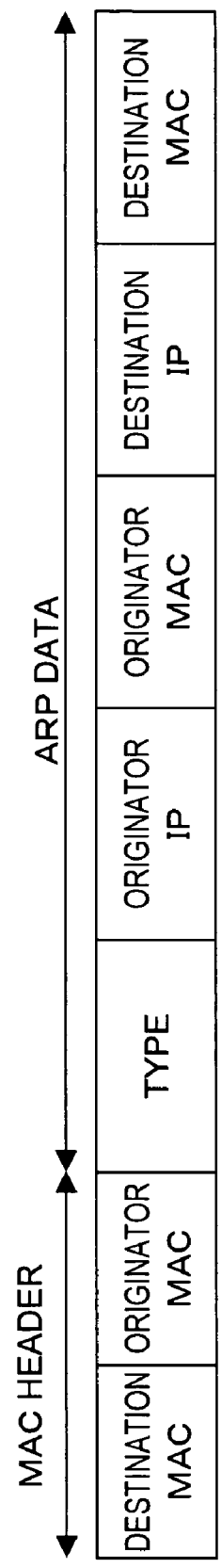

FIGS. 9A and 9B show formats of the MAC packet, and more specifically the MAC header has three fields consisting of destination MAC, originator MAC and type. In the diagrams showing the associated MAC packet formats besides FIGS. 9A and 9B, the type of the MAC header is not shown for the purpose of simplification.

First, in conformity with the first and second embodiments, the invention apparatus 100 consecutively issues PAC packets PKT2 of the format shown in FIG. 9A to obtain the state where there disappears a loop LP1 caused by the MAC packet PKT1 originating from the end host 200A to be communicated (P1). At this time, a loop LP2 caused by the MAC packet PKT2 issued from the invention apparatus 100 remains not disappeared for a while.

While an ARP request packet is then issued in this embodiment, the destination IP address requested is set to an IP address (=IPA) of the end host 200A within the ARP request packet of the format structure shown in FIG. 9B, with requester IP and MAC addresses within the ARP request packet being set to an IP address (=IPX) and a MAC address (=MX) that are not used in the subnet in the same manner as the second embodiment. A single or a plurality of packets are then sent with the ARP requesting originator MAC address within the MAC header portion being set to MX and with the destination MAC address set to a broadcast MAC address (=BC). This enables the sent ARP request packet to be broadcast while looping (LP3).

When receiving a single ARP request packet, the end host 200A sends a single ARP response packet to the destination MAC address (=MX) (P2).

This MAC address (=MX) is erroneously learned by all of the relay switches SW1 and SW2 as long as it exists at the looping point, as a result of which the ARP response is relayed toward the loop so that the MAC address (=MA) of the end host 200A is normally learned at each relay switch along the relay path (P3).

In the above state, by sending and receiving the packets PKT3 and PKT4 intended for communication between the end hosts 200A and 200B, the communication can be recovered even when the mis-learning occurs (P4). Since the end host 200A continues to respond to the ARP resulting in a high load, the loop packet may be replaced with one not subjecting the host to such a high load after the normal learning so that the response is ceased. This approach is applicable not only to the ARP but also to various protocols such as IP multicast and IP broadcast protocols as long as the end host responds to the broadcast packet.

Fourth Embodiment

The feature of a fourth embodiment lies in that mis-learning is corrected without stopping the packets causing mis-learning from looping.

Figure 10:
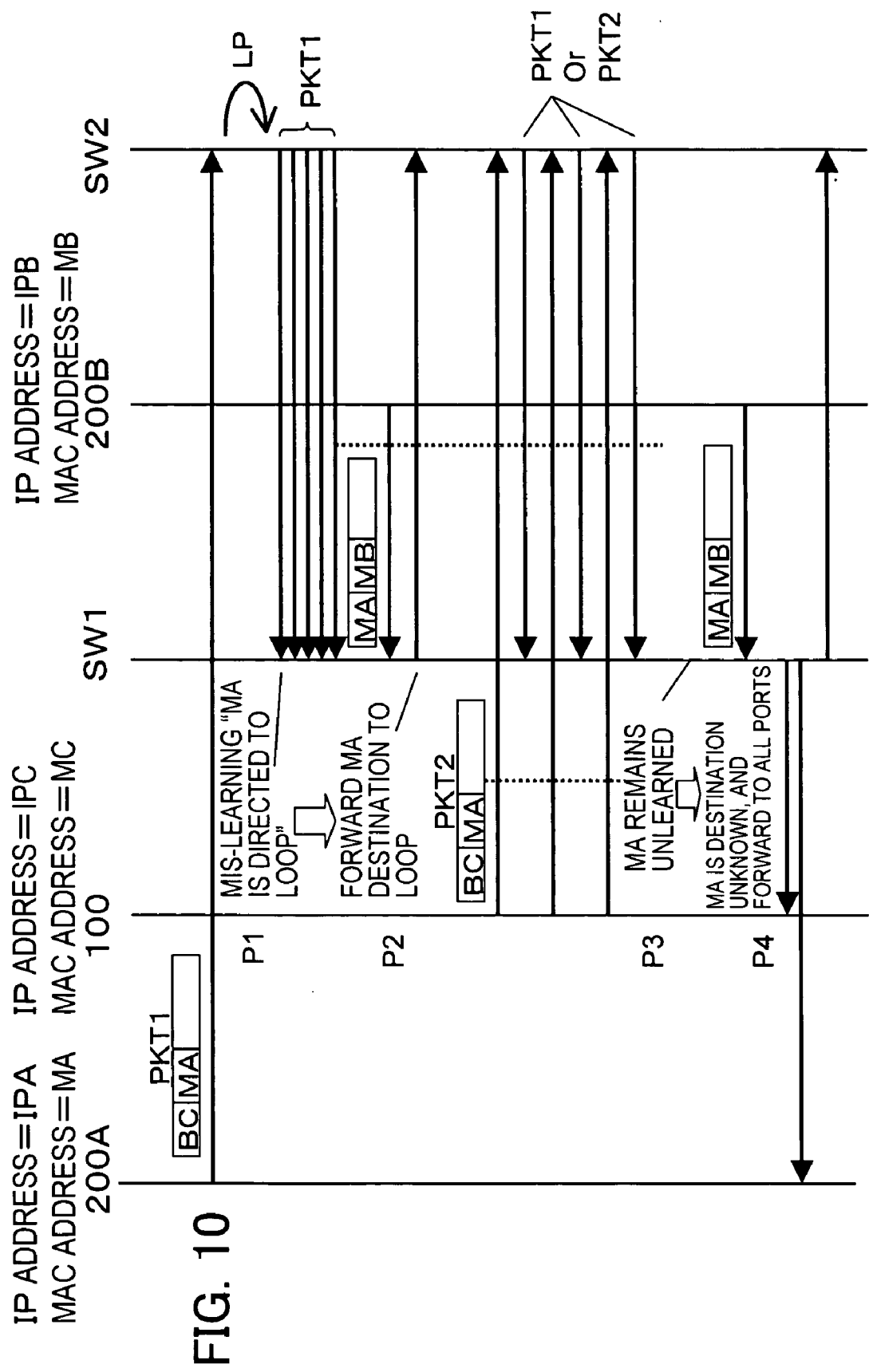
FIG. 10 shows signal sequences corresponding to a fourth embodiment.

FIG. 10 shows sequences of signals corresponding to such a fourth embodiment. In certain type of Ethernet relay switches, when packets having the same originator address (in this case, MAC address (=MA) of the end host 200A) often arrive at different ports (P1-P2), the ports learning the address MA are frequently changed and the normal learning is regarded as being difficult so that the corresponding MAC addresses are temporarily deleted from the learning table, with the result that the address MA becomes unlearned (P3).

In that event, when a packet directed to the end host 200A intended for communication arrives at a relay switch, the packet is regarded as destination unknown due to its unlearned MA, and is broadcast to all the ports in spite of the unicast packet (P4). This enables the packet to be forwarded to correct ports as well although normal learning is not achieved, resulting in the same effect as obtained when the mis-learning has been corrected.

In order to present such a state, consecutive sending has only to be made of MAC packets having the address MA as the originator address. By way of example, in the third embodiment, the same effect can be obtained as the case where the mis-learning has been corrected at the relay switch (see P3 of FIG. 8) by allowing the end host to respond to the packets consecutively broadcast by the loop, instead of completely stopping the packets causing the mis-learning from looping in advance.

As alternative, the invention apparatus 100 may be disposed in a subnet different from the looping subnet such that unicast packets are consecutively sent to a host within the looping subnet by way of a router that is a gateway to the looping subnet. Even though a broadcast packet sent from the router loops, this embodiment temporarily allows the packet directed to the router to be normally forwarded from the host, enabling communication with the invention apparatus 100 via the router.

With the above state, by sending and receiving the packets intended for communication between the end hosts, such an effect can be obtained that the communication is recovered even when the mis-learning takes place. In case of the above example, the destination address need not necessarily be the unicast address but instead can be any addresses such as the MAC broadcast address and MAC multicast address.

Fifth Embodiment

Description will be made of a fifth embodiment where the address mis-learning is stopped and corrected remotely by allowing an end host belonging to a remote subnet different from a looping subnet to remotely control the invention apparatus within or outside the looping subnet.

Figure 11:
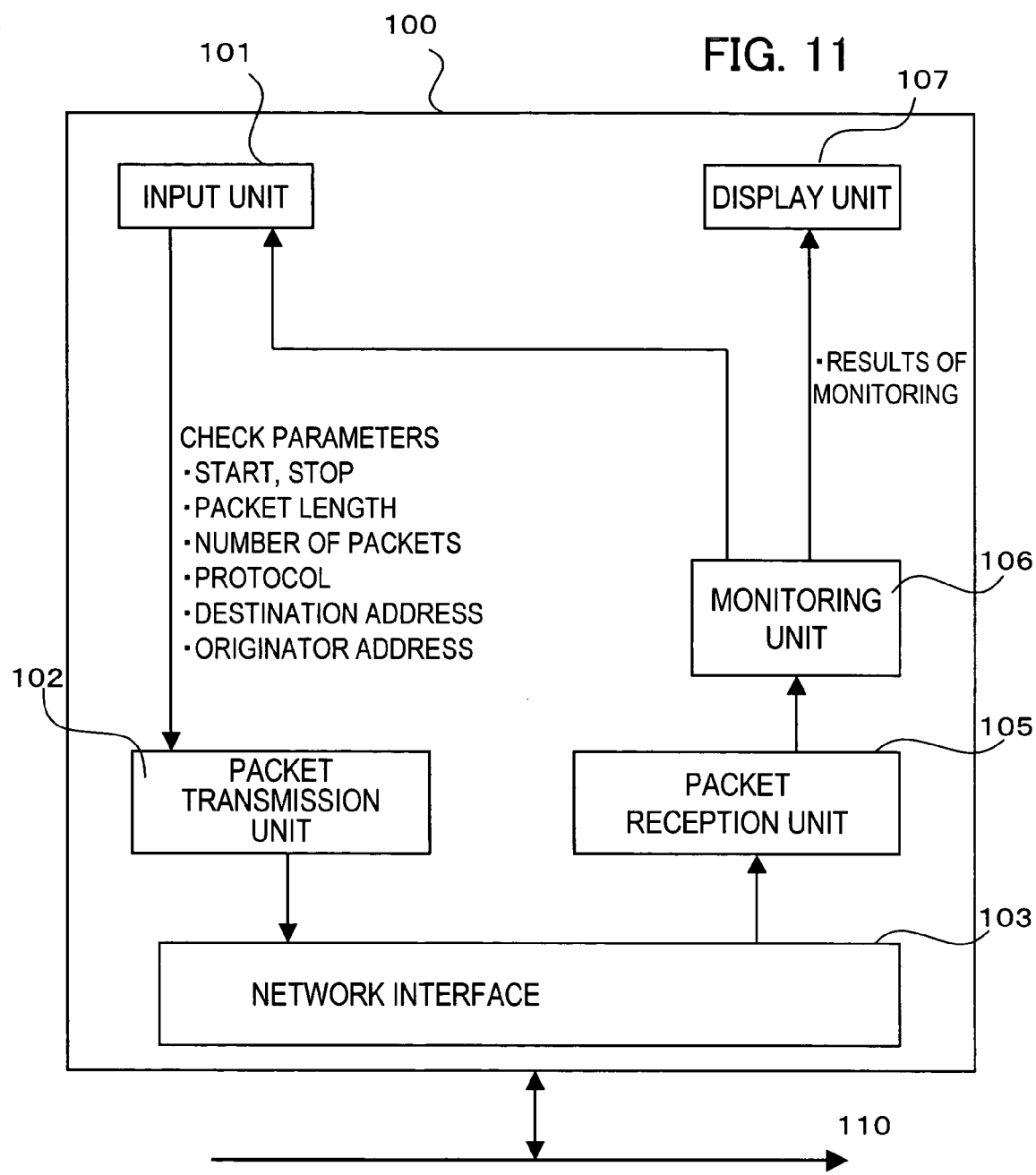
FIG. 11 shows an exemplary functional configuration of the invention apparatus that is applied to a fifth embodiment.

FIG. 11 shows an example of the functional configuration of the invention apparatus, which is applied to such a fifth embodiment. To and from the invention apparatus 100 previously disposed within a looping subnet as an end host within the subnet, a remotely existing end host sends a control message through communication means such as telnet or SNMP (Simple Network Management Protocol) and receives the control message through the packet reception unit 105 thereof. The invention apparatus 100 interprets the received control message as input of the control parameter through a remote control unit 104 thereof to effect the same operations as those in any of the first to fourth embodiments. No specific limitations are imposed on the control message as long as any existing communication means are used. For example, in case of using TCP/IP, the socket communication inclusive of telnet or SNMP may carry the control message.

In the event of the invention apparatus 100 acting as a host connecting to a looping subnet, as shown in FIG. 11, the interface 103 sending and receiving a control message is identical to the interface sending a broadcast packet intended for stopping and correcting the mis-learning. Alternatively, a plurality of physically different interfaces may be employed as long as they operate as a logically single end host.

The interface may be implemented as part of the logical function of a router (gateway) at the boundary via which the looping subnet connects to an external network. In this case, the network interface 103 of FIG. 11 is divided into two portions, i.e., the subnet side and the external network side although as the logical function the router-directed packets are once received by the packet reception unit 105, effecting substantially the same subsequent operations.

The invention apparatus 100 need not necessarily be disposed within a looping subnet. The same effect can be obtained by, as in the first embodiment, by consecutively sending ICMP Echo Request packets whose destination is IP broadcast address from the outside of the subnet to the interior of the looping subnet.

Sixth Embodiment

The feature of a sixth embodiment lies in that the MAC address can be acquired from the IP address upon the occurrence of loop.

Figure 12:
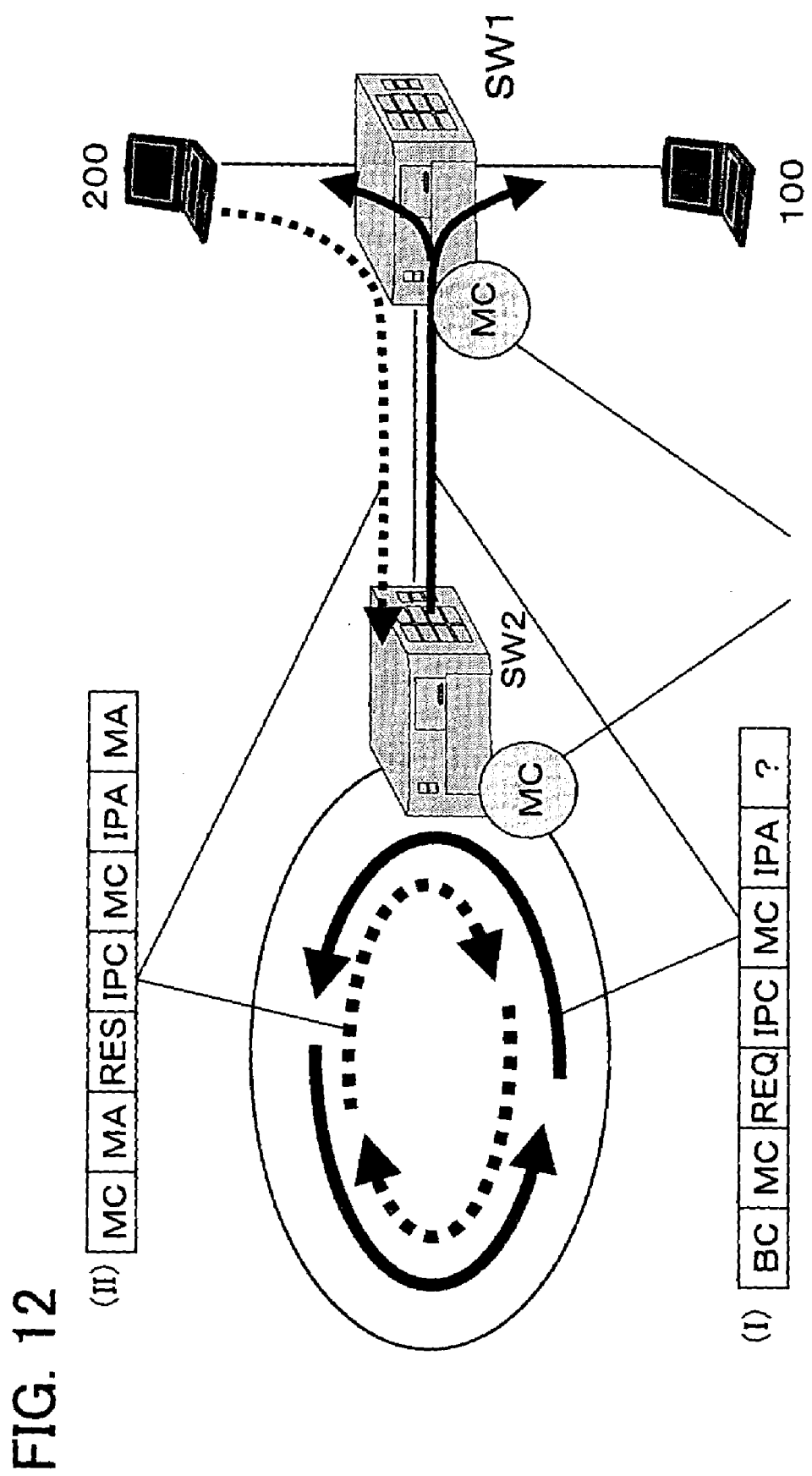
FIG. 12 is an explanatory view describing the concept of mis-learning in a sixth embodiment.
Figure 13:
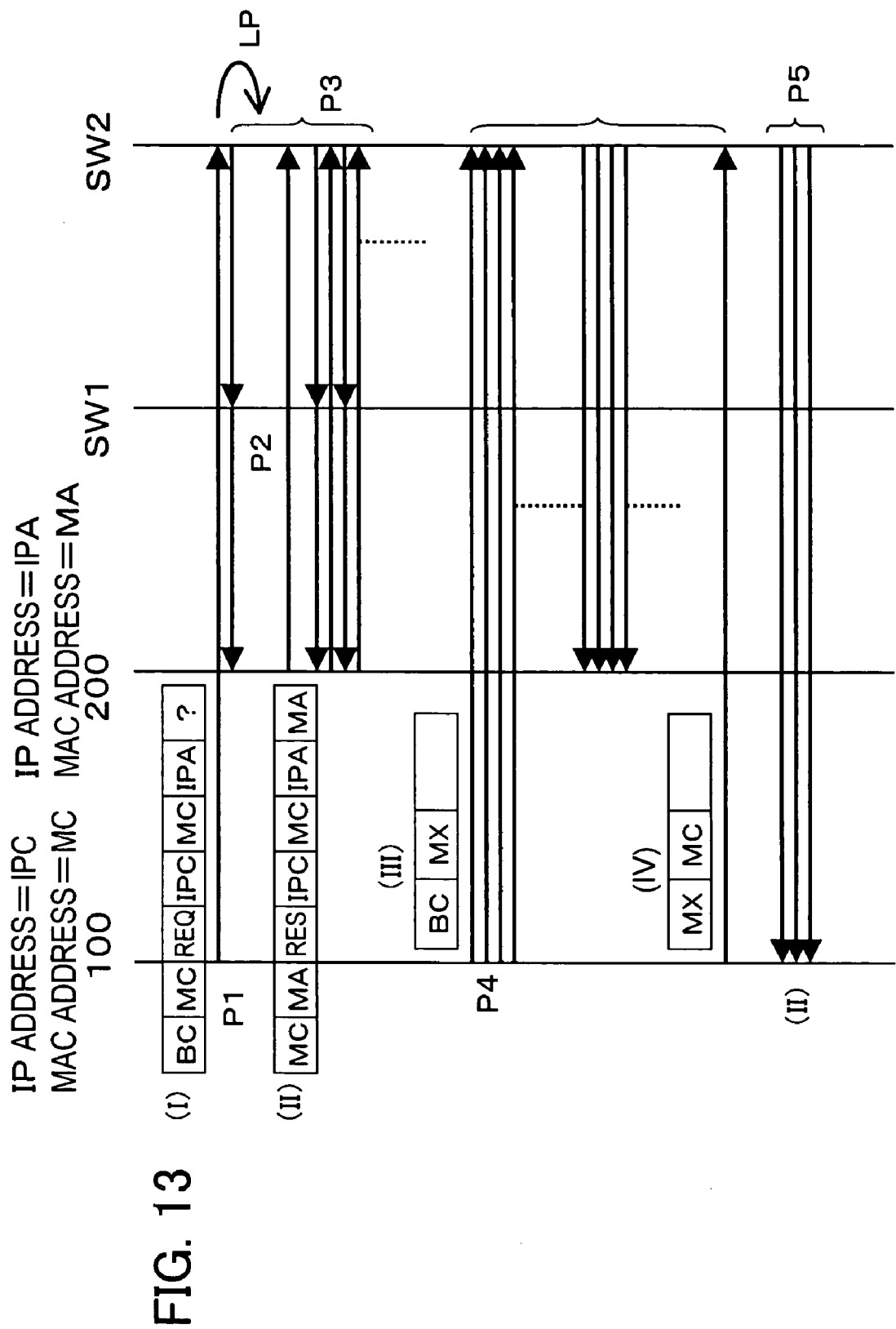
FIG. 13 shows signal sequences corresponding to the sixth embodiment.

FIG. 12 is an explanatory view of the concept of mis-learning in the sixth embodiment. FIG. 13 shows signal sequences corresponding to the sixth embodiment.

As is apparent from FIG. 12, when the invention apparatus 100 intends to communicate with another end host 200 within the subnet upon the occurrence of loop, the invention apparatus 100 needs to send an ARP request to acquire a MAC address (=MA) of the end host 200 even if it knows the IP address (=IPA) of the end host 200.

However, when issuing a broadcast packet such as the ARP request upon the occurrence of loop (P1), the packet becomes looped leading to mis-learning of the MAC address (MC) of the invention apparatus 200 (P2). This prevents a response to the ARP request to normally return to the invention apparatus 100, with the result that the MAC address (MA) of the end host 200 cannot be acquired resulting in the communication disabled.

The state at that time will hereinafter be described in detail. As a result of looping of an ARP request (I) from the invention apparatus 100, the end host 200 often receives the ARP request originating from the invention apparatus and, for each reception, issues an ARP response (II). However, the MAC address (=MC) of the invention apparatus 100 is erroneously learned as being present at the looping point by the switches SW1 and SW2.

For this reason, all the ARP responses (II) sent from the end host 200 are consequently forwarded to the looping point so that mis-learning at the looping point leads to ARP response packets becoming looped at the looping point (P3).

Ordinarily, as shown in FIG. 12, unicast packets are looped in the opposite direction (broken line of FIG. 12) to the direction (solid line of FIG. 12) where the broadcast packet turns. Thus, as shown in FIG. 13, the ARP request packets are caused to disappear from the loop by sending a large number of broadcast packets (III) having a non-existent MAC address (=MX) as the originator MAC address, as in the first or third embodiment.

When the invention apparatus 100 then issues any MAC packet (IV) with MC of the invention apparatus as the originator MAC address and with MX as the destination MAC address as in the third embodiment for example, mis-learning at the switches SW1 and SW2 is corrected based on the principle of the third embodiment. As a result, the looped ARP response packet (II) sent from the end host 200 is forwarded toward the invention apparatus 100 which finally receives the ARP response to acquire the MAC address (=MA) of the end host 200 (P5).

Thus, even in the event of looping, the MAC address of the end host 200 can be acquired using the ARP protocol.

As set forth hereinabove based on the embodiments in conjunction with the accompanying drawings, even when the L2 loop broadcast storm takes place, the present invention secures the communication path between the hosts within a looping subnet or between a host within the looping subnet and a host outside the looping subnet, enabling the communication within the subnet.

This ensures reliability of the communication qualities, contributing to industry to a great extent.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A communication control method, for sending packet data from a source end host to a destination end host in a communication system where data transmission/reception is carried out between a plurality of end hosts connected to relay switches within a subnet, the method comprising:

when a packet loop occurs as a result of L2-level misconnection at a relay switch, consecutively sending from a control unit, packets each having, as its originator address, a MAC address other than an originator MAC address of the source end host, which is desired to communicate with the destination end host to stop the packet loop; and sending from the source end host to the destination end host, packet data having a destination MAC address of the destination end host, wherein the packets to be consecutively sent from the control unit are multicast using as an originator MAC address an address not existing in the subnet.

2. A communication control method for sending packet data from a source end host to a destination end host in a communication system where data transmission/reception is carried out between a plurality of end hosts connected to relay switches within a subnet, the method comprising:

when a packet loop occurs as a result of L2-level misconnection at a relay switch, consecutively sending from a control unit, packets each having, as its originator address, a MAC address other than an originator MAC address of the source end host, which is desired to communicate with the destination end host to stop the packet loop;

sending from the source end host to the destination end host, packet data having a destination MAC address of the destination end host; and setting a MAC address not existing within the subnet as the originator address to consecutively send the packets to be broadcasted.

3. A communication control method for sending packet data from a source end host to a destination end host in a communication system where data transmission/reception is carried out between a plurality of end hosts connected to relay switches within a subnet, the method comprising:

when a packet loop occurs as a result of L2-level misconnection at a relay switch, consecutively sending from a control unit, packets each having, as its originator address, a MAC address other than an originator MAC address of the source end host, which is desired to communicate with the destination end host to stop the packet loop;

sending from the source end host to the destination end host, packet data having a destination MAC address of the destination end host;

setting an MAC address not existing within the subnet as the originator address; and sending packets whose destination is a broadcast address, to which the destination end host responds in unicast; and thereby allowing the relay switch within the subnet to correctly learn the MAC address of the source end host.

4. A communication control method for sending packet data from a source end host to a destination end host in a communication system where data transmission/reception is carried out between a plurality of end hosts connected to relay switches within a subnet, the method comprising:

when a packet loop occurs as a result of L2-level misconnection at a relay switch, consecutively sending from a control unit, packets each having, as its originator address, a MAC address other than an originator MAC address of the source end host, which is desired to communicate with the destination end host to stop the packet loop;

sending from the source end host to the destination end host, packet data having a destination MAC address of the destination end host;

setting an MAC address not existing within the subnet as the originator MAC address;

sending from the first end host, unicast packets whose destination is an address not existing within the subnet; and thereby allowing the relay switch within the subnet to correctly learn the MAC address of the source end host.

5. A communication control method for sending packet data from a source end host to a destination end host in a communication system where data transmission/reception is carried out between a plurality of end hosts connected to relay switches within a subnet, the method comprising:

when a packet loop occurs as a result of L2-level misconnection at a relay switch, consecutively sending from a control unit, packets each having, as its originator address, a MAC address other than an originator MAC address of the source end host, which is desired to communicate with the destination end host to stop the packet loop;

sending from the source end host to the destination end host, packet data having a destination MAC address of the destination end host;

setting an MAC address not existing within the subnet as the originator MAC address;

sending from the source end host, packets whose destination is a multicast address, to which the destination end host responds in unicast; and thereby allowing the relay switch within the subnet to correctly learn the MAC address of the source end host.

6. A communication system, comprising:

relay switches;

originator and destination end hosts each configured to perform transmission/reception of data through the relay switches, the originator and destination end hosts lying within a subnet to make up the subnet; and a control unit configured to send packets in a consecutive manner, wherein when an L2 loop occurs as a result of L2-level misconnection at a relay switch, the control unit consecutively sends packets, each having, as an originator address, a MAC address other than an originator MAC address of the source end host, which is desired to communicate with the destination end host, thereby stopping the packet L2 loop, and wherein the packets to be consecutively sent from the control unit are multicast using as an originator MAC address an address not existing in the subnet.

7. A communication system, comprising:

relay switches;

originator and destination end hosts each configured to perform transmission/reception of data through the relay switches, the originator and destination end hosts lying within a subnet to make up the subnet; and a control unit configured to send packets in a consecutive manner, wherein when an L2 loop occurs as a result of L2-level misconnection at a relay switch, the control unit consecutively sends packets, each having, as an originator address, a MAC address other than an originator MAC address of the source end host, which is desired to communicate with the destination end host, thereby stopping the packet L2 loop, and wherein a MAC address not existing within the subnet is set as the originator address to consecutively send the packets to be broadcast.

8. A communication system, comprising:

relay switches;

originator and destination end hosts each configured to perform transmission/reception of data through the relay switches, the originator and destination end hosts lying within a subnet to make up the subnet; and a control unit configured to send packets in a consecutive manner, wherein when an L2 loop occurs as a result of L2-level misconnection at a relay switch, the control unit consecutively sends packets, each having, as an originator address, a MAC address other than an originator MAC address of the source end host, which is desired to communicate with the destination end host, thereby stopping the packet L2 loop, and wherein a MAC address not existing within the subnet is set as the originator MAC address, with packets being sent whose destination is a broadcast address, to which the destination end host desired to respond in unicast, the relay switch within the subnet being allowed to correctly learn the MAC address of the end host.

* * * * *